US012665242B2

(12) United States Patent　　　　(10) Patent No.:　US 12,665,242 B2
Pifferi et al.　　　　　　　　　　　　 (45) Date of Patent:　　Jun. 23, 2026

(54) 1S2P BATTERY PACK FOR FAST CHARGE APPLICATION-LAYERED STRUCTURE WITH PCM POUCHES AND COMPRESSIBLE FOAM FOR SWELLING ABSORPTION

(71) Applicant: Datalogic IP Tech S.r.l., Calderara di Reno (IT)

(72) Inventors: Marco Pifferi, San Cesario sul Panaro (IT); Giuseppe Pio Frascolla, Bologna (IT); Francesco Pugliese, Bologna (IT); D'ulisse Marco, Bologna (IT)

(73) Assignee: Datalogic IP Tech S.r.l., Calderara di Reno (IT)

( * ) Notice: Subject to any disclaimer, the term of this patent is extended or adjusted under 35 U.S.C. 154(b) by 654 days.

(21) Appl. No.: 18/149,628

(22) Filed: Jan. 3, 2023

(65) Prior Publication Data

US 2024/0113361 A1　　Apr. 4, 2024

Related U.S. Application Data

(60) Provisional application No. 63/411,520, filed on Sep. 29, 2022.

(51) Int. Cl.
H01M 10/659　　　(2014.01)
H01M 10/04　　　(2006.01)
　　　　(Continued)

(52) U.S. Cl.
CPC ..... H01M 10/659 (2015.04); H01M 10/0436 (2013.01); H01M 10/482 (2013.01);
　　　　(Continued)

(58) Field of Classification Search
CPC ............. H01M 10/659; H01M 10/482; H01M 10/486; H01M 50/242; H01M 50/247;
　　　　(Continued)

(56) References Cited

U.S. PATENT DOCUMENTS

2015/0037616 A1　　2/2015　Wyatt et al.
2015/0037649 A1　　2/2015　Wyatt et al.
　　　　(Continued)

OTHER PUBLICATIONS

Changcheng Liu, Dengji Xu, Jingwen Weng, "Phase Change Materials Application in Battery Thermal Management System: A Review", Oct. 16, 2020, 37 pgs., downloaded at https://www.ncbi.nlm.nih.gov/pmc/articles/PMC7603007/, Sep. 30, 2022.

(Continued)

*Primary Examiner* — Adam A Arciero
(74) *Attorney, Agent, or Firm* — Foley & Lardner LLP

(57)　　　　ABSTRACT

A rechargeable battery pack may include at least one rechargeable battery cell and at least one phase change material (PCM) pouch in contact with the at least one rechargeable battery cell within a housing. The battery pack may include electrical conductors electrically connected to the at least one rechargeable battery cell to enable electrical power to be conducted to and from the at least one rechargeable battery cell. A compressible element, such as a foam element, may be positioned between a PCM pouch and an inside wall of the housing, thereby absorbing swelling of the rechargeable battery cell(s) to reduce risk of damage to the battery cells and battery pack. The electrical conductors may be formed on a rigid-flex printed circuit board (PCB).

20 Claims, 13 Drawing Sheets

100

102

104

(51) Int. Cl.

| | |
|---|---|
| *H01M 10/48* | (2006.01) |
| *H01M 10/613* | (2014.01) |
| *H01M 10/623* | (2014.01) |
| *H01M 50/242* | (2021.01) |
| *H01M 50/247* | (2021.01) |
| *H01M 50/284* | (2021.01) |
| *H01M 50/519* | (2021.01) |

(52) U.S. Cl.
CPC ....... *H01M 10/486* (2013.01); *H01M 50/242* (2021.01); *H01M 50/247* (2021.01); *H01M 50/284* (2021.01); *H01M 50/519* (2021.01); *H01M 10/613* (2015.04); *H01M 10/623* (2015.04); *H01M 2220/30* (2013.01)

(58) Field of Classification Search
CPC ............. H01M 50/284; H01M 50/519; H01M 10/613; H01M 10/623; H01M 2220/30; H01M 10/425; Y02E 60/10
See application file for complete search history.

(56) References Cited

U.S. PATENT DOCUMENTS

| | | |
|---|---|---|
| 2021/0084764 A1 | 3/2021 | Yang et al. |
| 2022/0115714 A1 | 4/2022 | Davey et al. |

OTHER PUBLICATIONS

H.V. Venkatasetty and Y.U. Jeong, "Recent advances in lithium-ion and lithium-polymer batteries", Seventeenth Annual Battery Conference on Applications and Advances, Jan. 18, 2002, pp. 173-178 (6 pgs), downloaded at https://ieeexplore.ieee.org/stamp/stamp.jsp? tp=&arnumber=986391, Sep. 30, 2022.

Rami Mohammed Reda Saeed, "Thermal characterization of phase change materials for thermal energy storage", Spring, 2016, 121 pgs, downloaded at https://scholarsmine.mst.edu/masters_theses/7521/, Sep. 30, 2022.

Robu.in, "Lithium-ion Battery vs. Lithium-polymer Battery", Apr. 20, 2020, 3 pgs., downloaded at https://robu.in/lithium-ion-battery-vs-li-po-battery/, Sep. 30, 2022.

Rockett, Danny, "What's the Bettery Battery for Your Portables—Li Ion or Li Poly?", May 18, 2018, 3 pgs., downloaded at https://www.electronicdesign.com/power-management/article/21806525/whats-the-better-battery-for-your-portablesli-ion-or-li-poly, Sep. 30, 2022.

Extended European Search Report for EP 23199609.1 dated Mar. 25, 2024, 7 pgs.

100

400

600

1000

1002 Place battery cell in first housing part

1004 Place PCM pouch in contact with Battery Cell in the first housing

1006 Electrically connect electrical conductors with battery cell

1008 Enclose the battery cell and the PCM pouch in the housing

1S2P BATTERY PACK FOR FAST CHARGE APPLICATION-LAYERED STRUCTURE WITH PCM POUCHES AND COMPRESSIBLE FOAM FOR SWELLING ABSORPTION

RELATED APPLICATIONS

This application claims priority to U.S. Provisional Patent Application having Ser. No. 63/411,520 filed on Sep. 29, 2022; the contents of which are incorporated herein by reference in their entirety.

BACKGROUND

Mobile devices, such as handheld barcode scanners, mobile telephones, and other mobile devices, often include a battery pack for powering the mobile devices. Battery packs typically include one or more battery cells that store electrical charge. The battery cells are typically rechargeable so that a user may simply recharge the battery cells rather than having to replace the battery cells. One problem with charging battery cells is the amount of time needed to recharge the battery cells. Another problem is the amount of heat generated during both charging and discharging the battery cells. Users, of course, prefer faster charging battery cells, but increased charging speed by using higher currents results in higher temperatures.

While charging the battery cells with a high charging rate (C-rate), as understood in the art, the thermal losses (proportional to the square of the charging current) can become considerable with higher currents and faster charging, thereby causing high temperatures in the battery pack. Safety issues, such as melting, fires, battery cell rupture, or otherwise, can occur if the temperature of the battery cells becomes outside of a recommended range.

Heating problems may be managed using battery material with good thermal characteristics, such as battery cells with low self-heating, printed circuit boards (PCBs) with low-loss components, or structures formed of materials with a high heat transfer coefficient to distribute heat uniformly in a battery pack. In addition, depending on an application, other methods to cool down battery cells within a battery pack can be used, such as the use of a fan placed close to the outside of the battery pack while charging the battery cells, liquid refrigeration for large battery packs, and so on. The problems with these solutions to prevent overheating of battery cells of mobile devices includes, but is not limited to weight, power, and cost.

In addition to there being a need to prevent overheating of battery cells of battery packs, there is also a problem with battery cells expanding or swelling in size as a result of heating over time within the battery packet as a result of aging effects. As such, there is a need for battery packs to accommodate variability of battery cells increasing and decreasing in size.

BRIEF SUMMARY

To support charging rechargeable battery packs with high current so as to charge battery cells of the battery packs at high C-rates without overheating, phase change material (PCM) pouch(es) may be included in a stack of elements within the battery packs so as to protect the battery pack from overheating when charging or discharging PCM pouch(es) include PCM material that transitions between physical states (e.g., from solid to liquid). The phase transitions of the PCM may be endothermic or exothermic. For example, PCM pouch(es) sink or store thermal produced by battery cells energy during charging of the and discharging battery cells of a battery pack. Such energy sinking may limit a temperature of a battery pack and battery cells thereof relative to battery packs lacking PCM pouch(es). The PCM material may source or release thermal energy during a non-usage or low energy usage of the battery powered device, which may cause the PCM material of the PCM pouch(es) to transition between physical states such that upon a further application of thermal energy to the PCM pouch(es), the PCM material may again sink thermal (e.g., from liquid back to solid) energy.

Moreover, because battery cells physically expand when heated or charged, foam or other elastic material may be included in the stack of elements in the battery pack. Battery cells tend to increase a dimension or size during charging because of thermal or other physical characteristic reasons. For example, a battery cell may increase in dimension incident to charging and decrease in dimension incident to discharging. Moreover, aging effects may cause a battery cell to increase in dimension over time (e.g., incident to development of the SEI). A PCM pouch may change dimension incident to a change of state. For example, the elastic material (e.g., foam) may decrease in dimension as a result of the battery cell and or PCM pouch swelling, thereby preventing an increase in pressure for the battery cell, battery cell housing cracking, etc. The elastic material may also expand in dimension when compressed as a result of the battery cell and/or PCM pouch contracting in size, thereby preventing or reducing voids forming between elements of the battery pack.

One embodiment of a battery pack may include a housing, at least one rechargeable battery cell disposed within the housing, at least one phase change material (PCM) pouch in contact with the rechargeable battery cell(s) disposed within the housing, and electrical conductors electrically connected to the at least one rechargeable battery cell to enable electrical power to be conducted to and from the at least one rechargeable battery cell.

One embodiment of a method of manufacturing battery pack may include placing at least one rechargeable battery cell in a first housing part of a housing. At least one phase change material (PCM) pouch may be placed in contact with the at least one rechargeable battery cell within the first housing part. Electrical conductors may be electrically connected with the at least one rechargeable battery cell to enable electrical power to be conducted to and from the at least one rechargeable battery cell. A second housing part of the housing may be connected to the first housing part, thereby enclosing the at least one rechargeable battery cell and the at least one PCM pouch in the housing formed by the first and second housing parts.

One embodiment of a mobile device may include electronics including a processor configured to control the mobile device, and electrical power electronics configured to output electrical power. The mobile device may further include a battery pack electronically coupled to the electronics to supply electrical power thereto, the battery pack configured with a housing, at least one rechargeable battery cell, at least one phase change material (PCM) pouch in contact with the at least one rechargeable battery cell to absorb heat produced thereby. The rechargeable battery cell(s) and PCM pouch(s) being enclosed within the housing. Electrical conductors may be in electrical communication with the power electronics and the rechargeable battery cell(s), and configured to conduct electrical power to and from the rechargeable battery cell(s).

BRIEF DESCRIPTION OF THE DRAWINGS

Illustrative embodiments of the present invention are described in detail below with reference to the attached drawing figures, which are incorporated by reference herein and wherein.

DETAILED DESCRIPTION OF THE DRAWINGS

Mobile devices often include a rechargeable battery pack that powers the mobile device. Designs of battery packs include many considerations in different application fields, including electronic, mechanical, and thermal technologies.

Electronic: design of a battery management system (BMS), which includes integrated circuit (IC) gauge (for state of charge (SOC) and state of health (SOH) estimations, communication, and temperature control), back-to-back field-effect transistors (FETs) for activation of charging and discharging paths, and protection circuits (primary and secondary protection circuits).

Mechanical: lithium polymer battery cells are affected by swelling phenomenon due to charging/discharging processes and aging of the battery cells. This unavoidable deformation of the battery cells may cause mechanical stress inside the battery pack, cracks of the plastic, and so on, thereby causing potential damage to the battery pack and mobile device, especially when the battery pack and mobile device has limited physical space. In the event of a battery pack leaking battery chemicals from a housing, there is a risk of fire or other potential hazard to users.

Thermal: for battery packs to operate in safe conditions, reduction of thermal dissipation inside the battery pack helps ensure that temperature in battery cells avoid exceeding safety limits. Because battery packs are often sealed and heat dissipation cannot be drawn from the battery pack to outside the battery pack in a mobile device (e.g., mobile phone, handheld barcode scanner, etc.), heating of battery cells inside the battery pack can be destructive or limit the speed at which the battery cells can be charged.

The electronic, mechanical, and thermal issues may be addressed using (i) a rigid-flex PCB with IC, FETs, protections, and contacts for battery cells and battery pack; (ii) Li-poly battery cell(s) (e.g., two battery cells with high C-charging rate (e.g., C-rate of about 5) placed inside the battery pack); (iii) phase change material (PCM) pouches, PCM material encapsulated in small, flexible pouches, placed near or in contact with the battery cells, and capable of absorbing high quantity of heat energy during physical phase transition (e.g., from solid to liquid) of the PCM material and to release the heat slowly, thereby reducing peak temperature of the battery cells; and (iv) compressible or elastic material (e.g., foam) to improve the mechanical flexibility of a structure of the battery pack and allow small deformation of the stack without cracks or breaks of plastic or other materials of the battery cells and/or structure (e.g., housing) of the battery pack.

Figure 1:
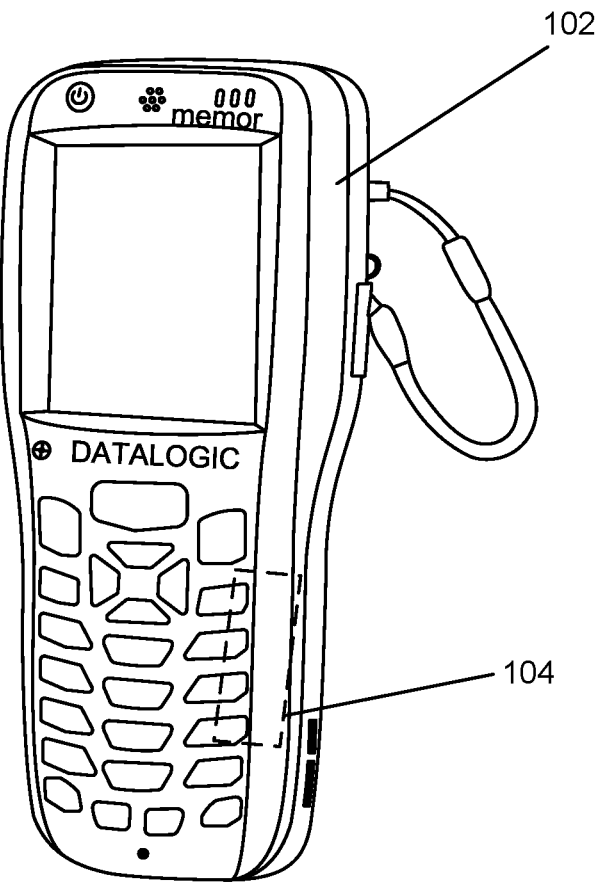
FIG. 1 is an illustration of an illustrative barcode scanner inclusive of a battery pack including one or more PCM pouches and foam elements contained therein.

With regard to FIG. 1, an illustration of an illustrative barcode scanner 100 is shown. The barcode scanner 100 may include a housing 102, which includes both a reader head and handle, configured to house a battery pack 104. The battery pack 104 may include one or more rechargeable battery cells. According to some embodiments, the battery pack 104 may be removable from the body 102 for charging. For example, the body 102 may include a cavity to receive a user-removable battery, battery electrical connector, and electrical contacts to connect thereto. According to some embodiments, the battery pack 104 may be charged while within the cavity of the housing 102. For example, the battery pack 104 may include electrical contacts (not shown) accessible via an exterior of the barcode scanner 100, or the housing 102 may include conductors to electrically connect the battery pack 104 to electrical contacts or connector (not shown) accessible via an exterior portion of the barcode scanner 100. In an embodiment, the barcode scanner 100 may be configured to be wirelessly recharged, such as using inductive charging with inductive coils. According to some embodiments, other battery-powered mobile devices, such as a mobile phone, calculator, remote control, or the like may include the battery pack 104 or another configuration of the battery pack including the same or analogous features described herein.

The battery pack 104 may alternate between a charging mode and a discharging mode. The charging mode increases a state of charge of the battery cells of the battery pack 104, and a discharging mode decreases a state of charge of the battery cells of the battery pack 104. As understood, dimension(s) of the battery cells may change in physical size due to natural thermal properties of the materials and housing of the battery cells, both over a short time span and longer time periods. For example, a battery may increase in dimension while increasing a state of charge, and decrease in dimension while decreasing a state of charge. Dimension(s) of the battery cells may change in physical size due to natural thermal properties of the materials and housing of the battery cells, both over a short time span and over a longer time span. In some cases, battery cells will become permanently deformed in size over time due to aging effects.

In some embodiments, the battery pack 104 may include one or more phase change material (PCM) pouches such that heat produced within the battery pack 104 (e.g., during charging and discharging of the battery cells) may change a physical state of the PCM (e.g., change state of the PCM material from solid to liquid). The change of state may absorb/store or release thermal energy that would otherwise increase the temperature of the battery pack 104 such that the maximum or average temperature of the battery pack 104 may be reduced as compared to not including the PCM pouch(es). Upon a low-power use of the device (e.g., subsequent to charging, during other than peaky periods, or the like), the PCM pouch(es) may release latent heat, which may thereby be dissipated by the battery pack 104. In the event of an additional charge, discharge, or peaky period that results in heat being generated, the PCM pouch(es) may further absorb thermal energy during a subsequent state change of the PCM material.

Figure 2:
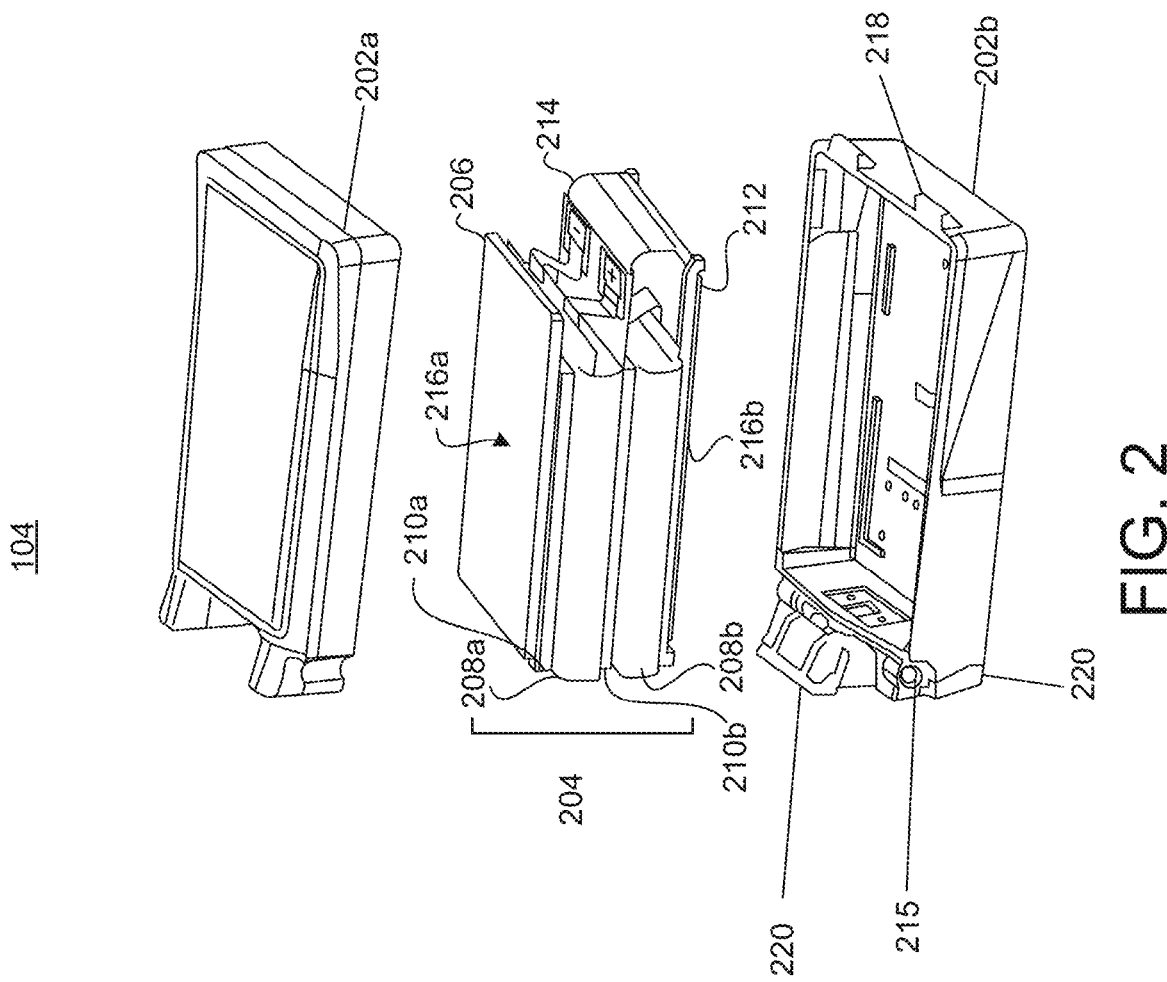
FIG. 2 is an illustration of an exploded view of an illustrative battery pack in accordance with the principles provided herein.

With regard to FIG. 2, an illustration of an exploded view of an illustrative battery pack 104 is shown. The battery pack 104 may be configured to be installed in the barcode scanner 100 of FIG. 1 or another mobile device according to the present disclosure. The battery pack 104 may include a first housing part 202a and a second housing part 202b (collectively battery pack housing 202). According to various embodiments, the battery pack housing 202 may include additional or fewer housing parts. The battery pack housing 202 may be configured to encapsulate a stack 204 of the components such that the battery pack housing 202 may provide environmental protection for the stack 204. The first housing part 202a and the second housing part 202b may contain mechanical interfaces to couple with one another, such as tabs, screws, adhesive surfaces, corresponding protrusions and indentations, or latches, locks, or the like. In an embodiment, the first housing part 202a or the second housing part 202b may further be coupled to or engaged with an elastic element 206, such as a foam element, of the stack 204. An adhesive or other securing means such as screw(s), may be utilized. Alternatively, compression of the element or retention features may retain the elastic element against the first or second housing part 202a or 202b.

The stack 204 may include a number of elements or components, including one or more battery cells 208a and 208b (collectively 208), PCM pouches 210a and 210b (collectively 210), frame 212, rigid-flex PCB 214, and elastic component 206. The stack 204 may have a total thickness that snugly fits within the battery pack housing 202 when the first and second housing parts 202a and 202b are connected with one another so as to be positionally retained thereby. For example, the stack 204 may have a first side 216a and a second side 216b that may be compressionally retained by inner surfaces of the first and second housing parts 202a and 202b. The elastic element 206 may be utilized to absorb expansion of the battery cells 208 and other elements within the battery pack housing 202. The battery cells 108 may be lithium (Li) poly cells. Alternative battery cell types may be utilized to perform the same or similar function.

Although the stack 204 includes two battery cells 208, it should be understood that alternative numbers and configurations of the battery cells 208 may be disposed in contact with the PCM pouches 210, where one of the PCM pouches 210a may be disposed between battery cell 208a and elastic component 206 and the other PCM pouch 210b may be disposed between the two battery cells 208. The frame 212 may be configured to provide a support structure for the stack 204 and enable the stack 204 to be removably secured within the battery pack housing 202. In alternative embodiments, (i) both PCM pouches 210a and 210b may be in contact with one another, for example, (ii) between the frame 212 and cell 208b, (iii) with the cell 208b in contact with the other cell 208a, or (iv) between cell 208a and elastic or compression element 206.

In particular, the first housing part 202a or the second housing part 202b may mechanically or thermally couple to a portion of the stack 204. For example, a recess, pin, latch, or other structural feature may be configured to receive a portion of the stack 204, such as the frame 212 and/or portion of the rigid-flex PCB 214. The recess, pin, latch, or other structural feature may retain or secure a portion of the stack 204 to the battery pack housing 202. The second housing part 202b may include a mechanical latch or structural feature 218 configured to be received by a complementary feature (not shown) formed by the first housing part 202a so as to releasably secured the first and second housing parts 202a and 202b together and form the battery pack housing 202. In some embodiments, a gasket, adhesive, or the like to help form a seal between the first housing part 202a and the second housing part 202b. In some embodiments, a groove, pin and socket, or other mechanical guide may be disposed upon a junction of the battery pack 104 to engage upon an alignment thereof. In some embodiments, the first housing part 202a or the second housing part 202b may include an opening 215 to receive a pin, screw, or the like to join the first housing part 202a to the second housing part 202b. Either of the first housing part 202a or the second housing part 202b of the battery pack housing 202 may likewise may be configured to connect to a feature or retained within a cavity of a battery powered device, such as the barcode scanner 100 of FIG. 1.

The first housing part 202a or the second housing part 202b may include one or more mechanical components 220 that enable the battery pack 104 to be inserted in a portable electronic device. Electrical connectors (not shown) may be power bricks supported with the second housing part 202b and inserted into holes with electrical conductors or connected to an electrical conductor mounted to a PCB (e.g., PCB 408a of FIG. 4) to provide power in a charging mode to the battery cells 208 from a remote power source and supply power from the battery cells 208 during a power usage mode. According to some embodiments, the same or different battery connectors may conduct energy to and from the battery pack 104. Similarly, one or more power buses on the rigid-flex PCB may conduct electrical power to and from the battery cells 208, and the power bus(es) may operate to supply power to both of the battery cells 208 simultaneously or independent of one another. For example, the electrical connector may be configured to electrically connect to the barcode scanner 100, and a second electrical connector (not shown) may be configured to electrically connect to a charger, or the electrical connector may be configured to electrically connect to both of a charger and the barcode scanner 100. The electrical connector may include various terminals, such as a positive terminal, a ground terminal, and an optional data terminal, and support any power and/or data communications protocol. In an embodiment, the mechanical components 220 may include electrical conductors and additionally function as an electrical connector.

Figure 3:
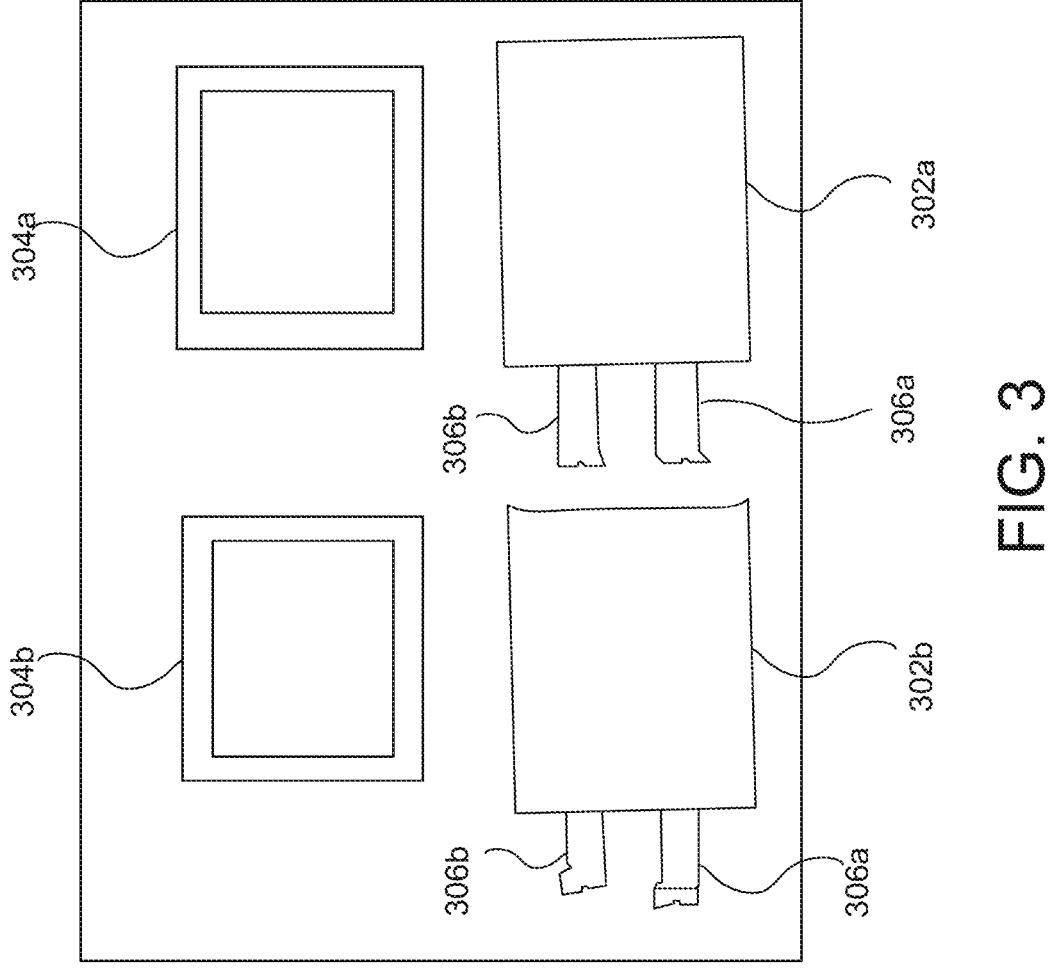
FIG. 3 is an illustration of illustrative battery cells and PCM pouches.

With regard to FIG. 3, an illustration of illustrative battery cells 302a and 302b (collectively 302), and PCM pouches 304a and 304b (collectively 304) are shown. Each of the battery cells 302 includes connection terminals (e.g., an anode terminal and a cathode terminal) 306a and 306b (collectively 306). Terminals can be rigid, semi-rigid, or flexible. Alternatively, rather than including terminals as shown, posts or a connector may be integrated with the battery cells 302. Thus, the dimension of the battery cells 302 may vary as a function of a total number of charges and a state of charge, amongst other potential functional parameters.

Although two PCM pouches 304 are shown, according to various embodiments, additional or fewer PCM pouches may be included as part of a battery pack, such as battery pack 104 of FIG. 2. The number of battery cells 302 and PCM pouches 304 may be the same or different in number and dimensions. Each of the PCM pouches 304 may include a same or different phase change material. In some embodiments, a PCM pouch may include more than one phase change material (e.g., a material having a different state-transition point). In some embodiments, two battery cells may be bounded by and sandwich the PCM pouches 304 (e.g., two battery cells may interface with three PCM pouches, three battery cells may interface with four PCM pouches, and so on). Rather than the battery cells 302 being bounded by PCM pouches 304, alternative configurations that allow for PCM pouches 304 to operate as thermal energy absorption elements may be utilized. A volume of PCM included in the PCM pouches 304 may be related to capacity of the battery cells 302. For example, the volume of the PCM material of the PCM pouches 304 may be configured to maintain a battery cell temperature below a temperature threshold during a charging thereof.

Figure 4A:
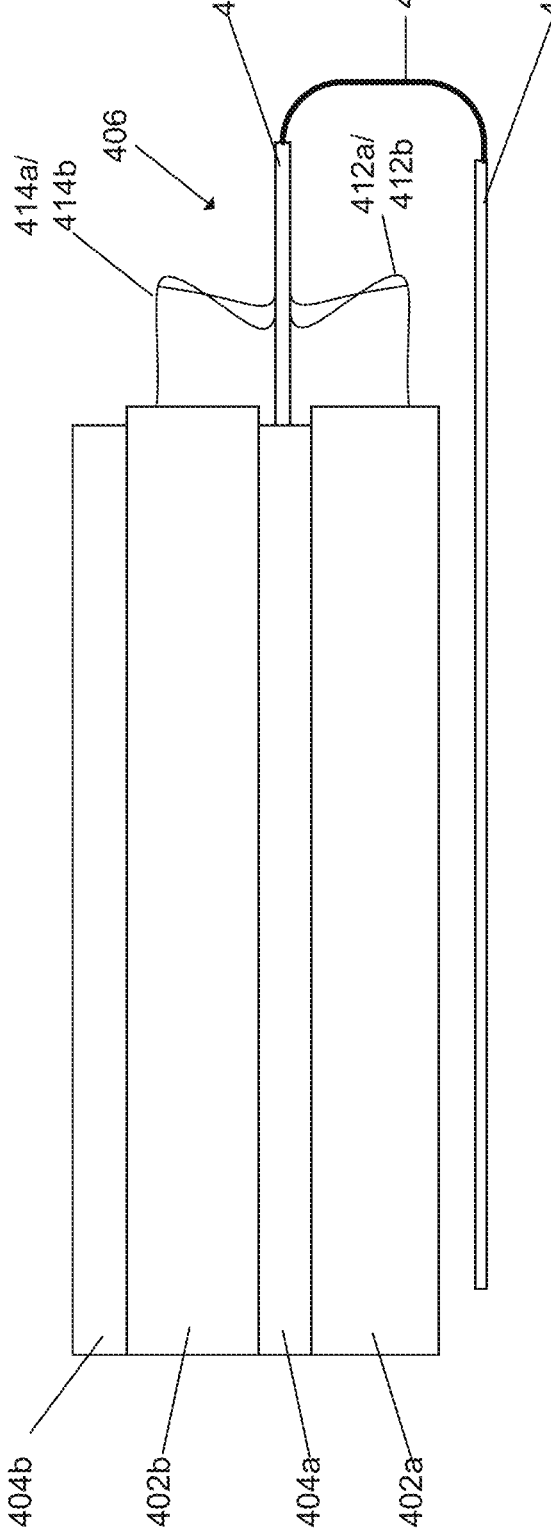
FIGS. 4A, 4B, and 4C are illustrations of illustrative battery cells, PCM pouches, and stacks thereof.

With regard to FIG. 4A, an illustration of an illustrative stack 400 for a battery pack (e.g., battery pack 104 of FIG. 1) including battery cells 402a and 402b (collectively 402) and PCM pouches 404a and 404b (collectively 404) thereof is shown. A rigid-flex PCB 406 may include a first PCB 408a that may include a controller 409 to monitor, control, or interrupt the operation of the battery pack including stack 400. The controller 409 may be a processor that retrieves instructions from a non-volatile memory to charge or discharge the battery pack according to the techniques disclosed herein, and be configured to control functionality of the devices in the stack 400. For example, the controller 409 may receive a temperature signal from a temperature sensor disposed on the first PCB 408a, a second PCB 408b, or on a wall of the battery cell(s) 402. The temperature sensor may be a thermocouple, thermistor, or the like. The first PCB 408a may electrically connect to the second PCB 408b via a flexible electrical connector 410. The flexible electrical connector 410 may include electrical conductors for each terminal of the battery cells 402. Lateral or other spacing between the electrical conductors may prevent an electrical fault (e.g., a short circuit) for any number of reasons (e.g., damaged electrical conductor(s) in the flexible electrical connector 410).

Figure 4B:
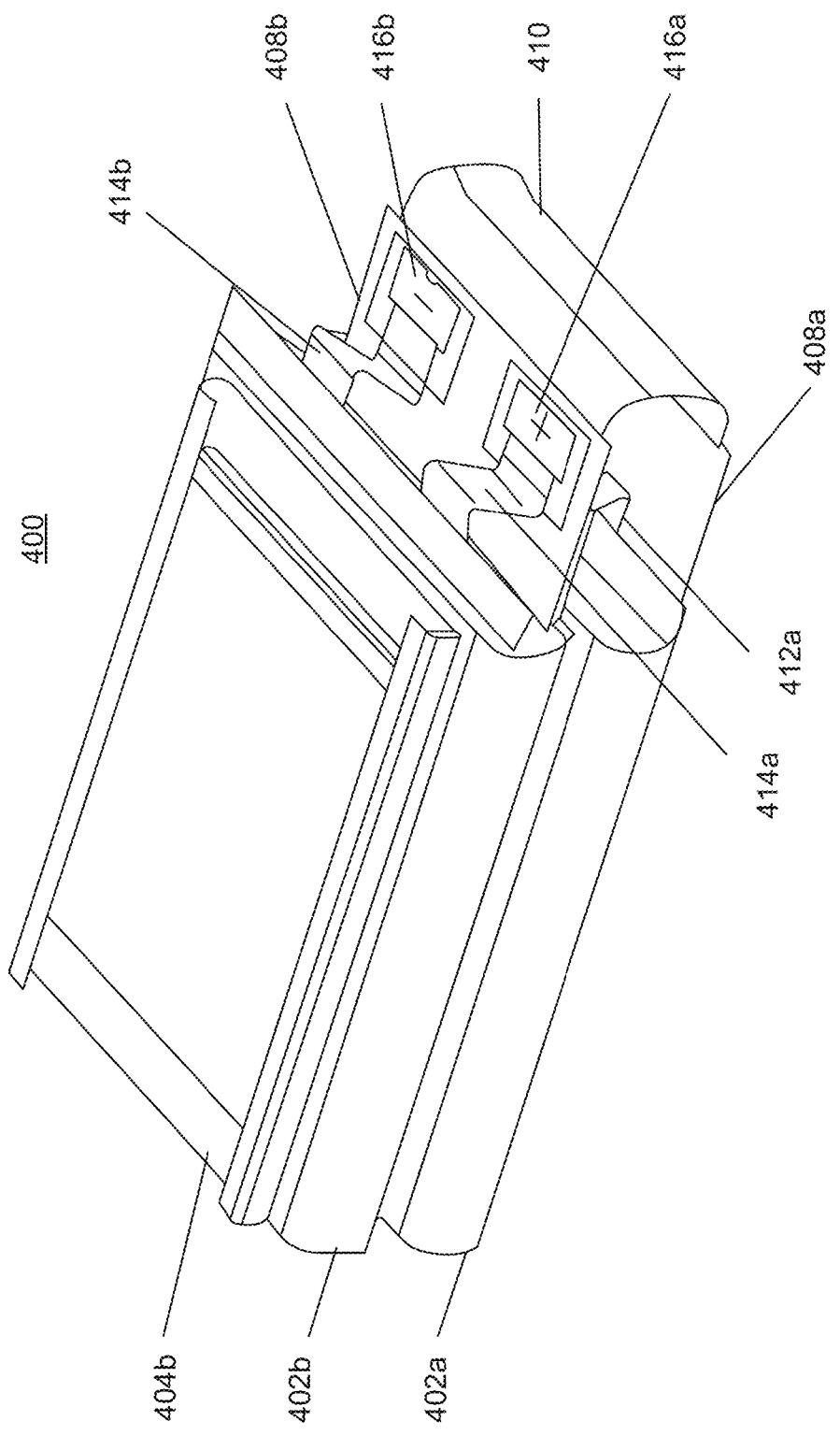

The second PCB 408b may include contact pads 416a and 416b (collectively 416; see FIG. 4B). For terminals 412a, 412b, 414a, 414b (collectively 412 and 414) of one or more respective battery cells 402 to be electrically connected thereto. For example, the second PCB 408b may have the first terminal 412a and the second terminal 412b of the first battery cell 402a connected to respective contact pads 416 along a first side of the second PCB 408b, and the first terminal 414a and the second terminal 414b of the second battery cell 402b on respective contact pads 416a and 416b may be connected to respective contact pads on a second side of the second PCB 408b. According to some embodiments, two or more battery cells may be electrically connected in a parallel configuration, such as by interconnecting contact pads. According to some embodiments, battery cells may be electrically connected in a series configuration such that the contact pads may each be electrically isolated from each other. The second PCB 408b may be equidistant from each of the battery cells 402a and 402b, which may equalize electrical paths for each of the battery cell terminals 412 and 414 between the battery cells 402 and the first PCB 408a. To further provide for equal electrical paths, the respective battery cell terminals 412 and 414 may be disposed at parallel positions on each side of the second PCB 408b. For example, each of the respective battery terminals 412 and 414 may be disposed in a like position relative to one another, such that upon an inversion and stacking of the second battery cell 402b over the first battery cell 402a, the first terminal 412a of the first battery cell 402a may overlay the second terminal 414a of the second battery cell 402b, and the second terminal 412b of the first battery cell 402a may overlay the first terminal 414a of the second battery cell 402b. Alternative configurations are possible.

The PCM pouches 404 of the stack 400 may contact the battery cells 402 to help maintain lower peak temperature thereof, as further described herein. For example, the first PCM pouch 404a may be disposed between and contact both of the battery cells 402. The second PCM pouch 404b may be disposed in contact with an opposite surface of the second battery cell 402b opposite the first PCM pouch 404a. The position of the second pouch 404b may be in contact with a top side of the second battery cell 402b. In alternative embodiments, the second PCM pouch 404b may be disposed along different, additional, or fewer battery cell surfaces. In some embodiments, an additional PCM pouch (not shown) may be disposed along another stack component to absorb heating therefrom. In some embodiments, a frame or other mechanical feature (see, for example, FIG. 5A) may interface with one or more of the battery cells 402 to conduct heat therefrom so as to, in part, cause thermal energy to be conveyed to another portion the battery pack for dissipation and to support the stack 400 within a housing of the battery pack.

With regard to FIG. 4B, another illustration of the stack 400 thereof is shown. As depicted, a central portion of the second PCM pouch 404b containing the PCM material may be disposed along a face of the second battery cell 402b. The first PCM pouch (not depicted) may be disposed along an opposite face of the second battery cell 402b and along a face of the first battery cell 402a, thereby being sandwiched between the battery cells 402. The second PCM pouch 404b may extend from one side to the other side of the stack 400, thereby assisting in maintaining both lateral and vertical positioning when the stack 400 is contained within a battery pack housing, such as battery pack housing 202 of FIG. 2.

As depicted, the first terminal 414a of the second battery cell 402b connects to the second PCB 408b, and the second terminal 414b of the second battery cell 402b connects to the second PCB 408b along a parallel path equal in length as the first terminal 414a. The second terminal 412b (FIG. 4A) of the first battery cell 402a may connect to the second PCB 408b on an opposite side as the second terminal 414b of the second battery cell 402b such that each connect between a battery cell and the second PCB 408b having the same distance. As previously described, the flexible electrical connector 410 may conduct signals from each of the terminals 412 and 414 along a conductive paths that do no intersect with one another such that the lengths of the conductive paths between the battery cells 402 and the first PCB 408a are approximately the same length and approximately the same resistance (i.e., having substantially similar electrical characteristics, such as within 5-percent or 10-percent of one another).

Figure 4C:
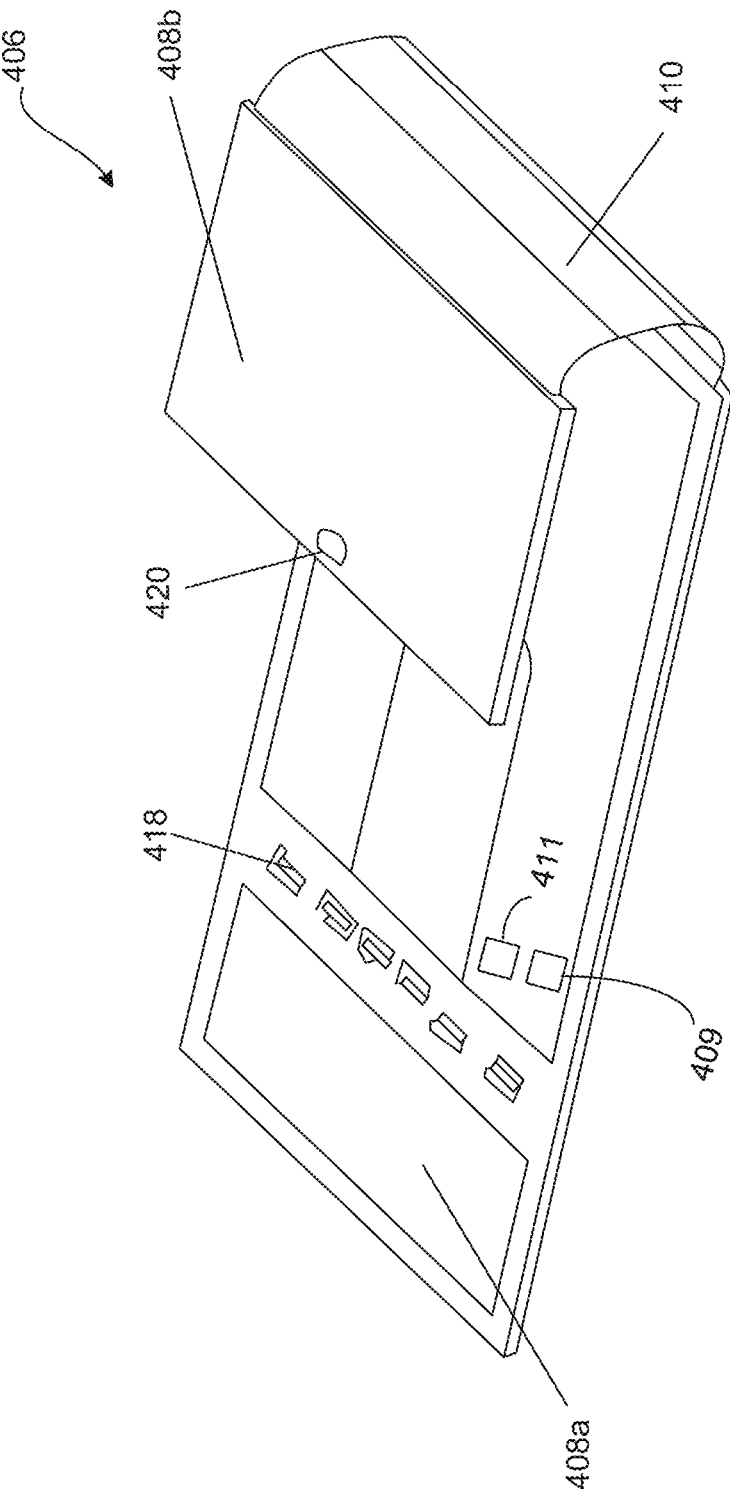

With regard to FIG. 4C, another illustration of the illustrative rigid-flex PCB 406 is shown. In an embodiment, the first PCB 408a may include controller 409, power conversion circuitry 411, or other elements of a battery management system (not shown). As an example, the first PCB 408a may include a transformer or other circuit component(s) 418 configured to charge the battery cells at a predetermined rate, such as 5 C or 10 C. The rate of charge may be constant or variable based on one or more real-time or non-real-time factors. In an embodiment, the rate of charge of the battery cells may be defined by the amount of heat that the battery pack is capable of handling based, at least in part, on the PCM pouches 404 contained therein. The first PCB 408*a* may include one or more electrical connectors, male and/or female, to receive a chassis connector (not shown), which may physically and electrically connect to an electrical connector of the battery housing. A temperature sensor 418 (e.g., a negative coefficient (NTC) thermistor) may reside on the second PCB 408*b*, for example, such that a temperature of or proximal to the first and second battery cells 408, or a PCM pouch disposed therebetween, may be sensed.

As shown, the second PCB 408*b* may be connected to the flexible electrical connector 410, which may electrically connect to the second PCB 408*b*. As previously described, the combination of the first PCB 408*a*, second PCB 408*b*, and flexible electrical connector 410 forms the rigid-flex PCB 406.

Figure 5A:
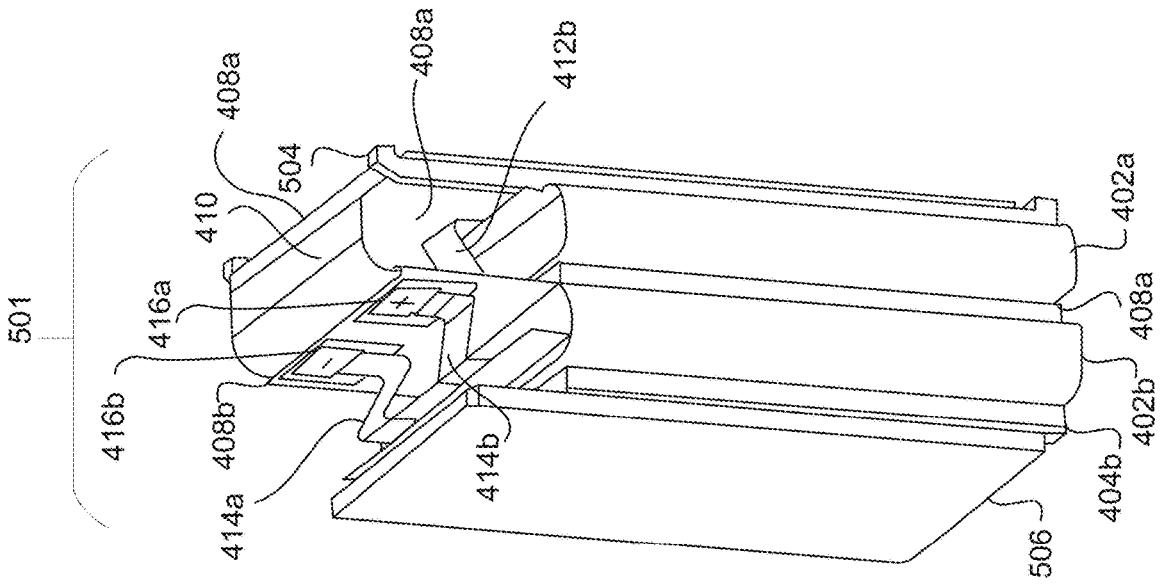
FIGS. 5A and 5B are illustrations of illustrative battery cells, PCM pouches, and stacks thereof disposed within a battery pack housing.

With regard to FIG. 5A, an illustration of components of an illustrative battery pack 500 is shown. The battery pack 500 depicts an assembled stack 501. As shown, a frame 504 may provide mechanical support for the first PCB 408*a*. The flexible electrical connector 410 electrically connects the first PCB 408*a* to the second PCB 408*b*. A first terminal 414*a* and a second terminal 414*b* of the second battery cell 402*b* connect to respective contact pads 416 of the second PCB 408*b*. The first terminal 412*b* and a second terminal (not depicted) of the second battery cell 402*b* connect to respective contact pads (not shown) disposed on an opposite side of the second PCB 408*b*. A first foam insert 506 is in contact with the second PCM pouch 404*b*. A first housing part 502*a* of a battery pack housing may encapsulate an upper portion of the depicted stack 501. For example, the first housing part 502*a* of the battery pack 500 may compress the first foam insert 506 when connected to a second housing part (see FIG. 6, for example).

Figure 5A:
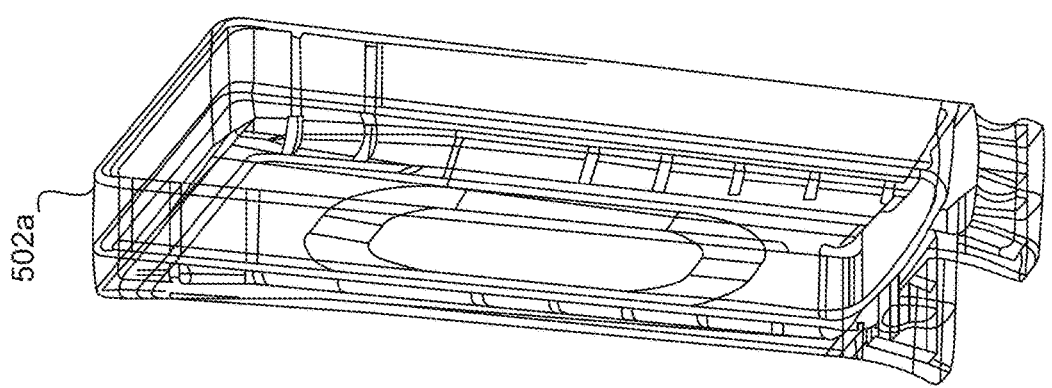
Figure 5B:
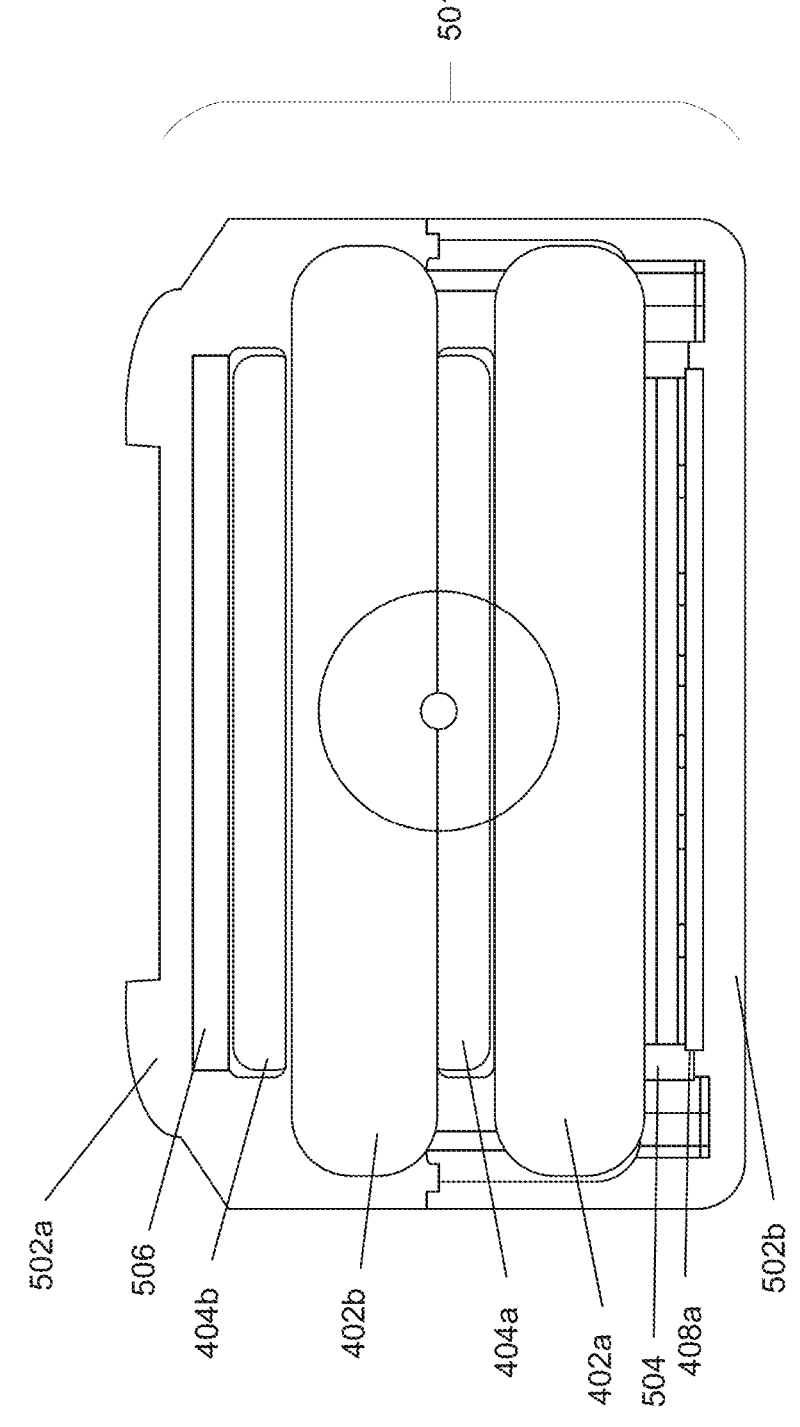

With regard to FIG. 5B, an illustration of an illustrative cross sectional view of the assembled battery pack 500 is shown. The battery pack 500 may include the stack 501 contained within battery pack housing 502 including the first housing part 502*a* connected to a second housing part 502*b*. The first housing part 502*a* and the second housing part 502*b* of the battery pack housing surround the stack 501 including the first PCB 408*a*, the frame 504, the first battery cell 402*a*, the first PCM pouch 404*a*, the second battery cell 402*b*, the second PCM pouch 404*b*, and first foam insert 506. The first housing part 502*a* and the second housing part 502*b* define a central cavity when connected for the stack 501 to reside therein. Because the battery cells 402 expand in size, as previously described when the battery cells are being charged and during operation of the mobile device in which the battery pack 500 is powering, the stack 501 includes the foam insert 506 or any other compressible material. In an alternative embodiment, additional foam inserts may be disposed elsewhere within the cavity defined by the housing parts 502 to maintain the stack 501 and elements thereof without or with minimal relative movement in the housing parts 502 when connected with one another and enabling swelling of the battery cells 402 and/or other elements of the stack 501 while preventing the housing parts 502 or other elements (e.g., battery cells 502, frame 504, etc.) from deforming or breaking.

Figure 6:
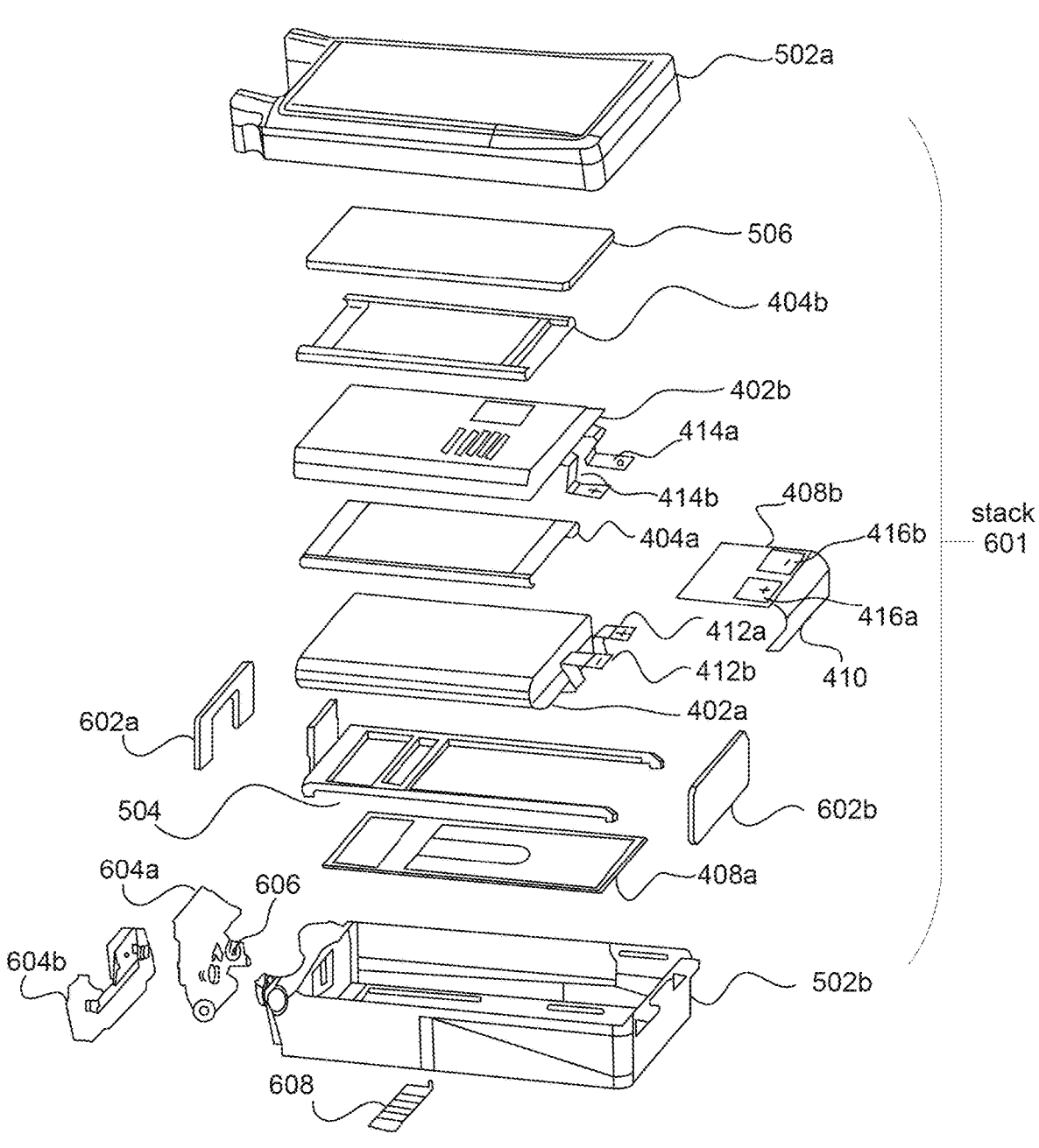
FIG. 6 is an illustration of an exploded view of an illustrative battery pack including PCM pouches and foam elements.

With regard to FIG. 6, an exploded view of an illustrative battery pack 600 including a stack 601 including at least a portion of the components of the stack 501 of FIG. 5 is shown. The battery pack 600 may include the first battery cell 402*a*, second battery cell 402*b*, first PCM pouch 404*a*, and second PCM pouch 404*b* in vertical alignment with one another. The battery cells 402 sandwich the first PCM pouch 404*a*, and the second PCM pouch 404*b* may be disposed on an opposite side of and along a face of the second battery cell 402*b*. An elastic or compressible material, such as the first foam insert 506 (e.g., an open cell foam insert) may be disposed between the second PCM pouch 404*b* and first housing part 502*a*. The first foam insert 506 may be a single, monolithic foam element or a combination of multiple foam elements (e.g., laterally or vertically aligned foam elements of the same or different materials).

The first foam insert 506 may be configured to elastically compress the first foam insert 506, which is equal to or greater than space between the battery housing parts 502 and the stack 601 independent of the thickness of the first foam insert 601 so as to account for temperature growth and battery aging (e.g., SEI development). One or more additional foam inserts 602*a* and 602*b* (collectively 602), which are configured as end-foam pieces, may be disposed along additional orientations with the same or different dimensions and be in contact with at least one of the battery cells 402 and the battery housing part(s) 502. For example, a second foam insert 602*a* and third foam insert 602*b* may be disposed between the first battery cell 402*a* or the second battery cell 402*b* and battery housing part(s) 502. The shapes of the additional foam inserts 602 may be configured to enable the frame 504, PCM pouches 404, and/or other components in the stack 601 to fit within the housing 502 and to minimize manufacturing time.

The battery pack 600 may further include mechanical components 604*a*, 604*b* (collectively mechanical component 604) and an electrical connector (not shown) that may electrically connect to the first PCB 408*a* to enable electrical power from an external power source to charge the battery cells 402. The mechanical component 604 may be formed of a single element or more than two elements, and may include a spring element 606 to assist in maintaining a certain force for retention or other purposes. An electrical contact 608 may be configured to electrically connect the battery pack 600 to an electrical energy sink/source (e.g., electrical charger in the form of a cradle or socket connector for a mobile device). The electrical contact 608 may include electrical conductors that extend through or are otherwise accessible via the battery housing parts 502, and may further be configured to enable the first PCB 408*a* to connect thereto (e.g., via an edge connector or a connector disposed on a center regions of the first PCB 408*a*), thereby providing additional support for the first PCB 408*a*. The battery housing 502 may provide for environmental and safety protection for other components of the battery pack 600. The first housing part 502*a* and the second housing part 502*b* of the battery pack 600 may contain mechanical interface features and/or components to couple the parts together, such as tabs, screws, adhesive surfaces, or the like. As previously described, the first housing part 502*a* and/or the second housing part 502*b* may engage or couple to element (s) of the stack 601, such as the foam insert 506 by an adhesive, mechanical connector (e.g., pin), or simply by compression forces. The first housing part 502*a* and/or the second housing part 502*b* of the battery pack housing parts 502 may be connected to or be in contact with the frame 504, thereby providing mechanical support or separation for the battery cells 502. In an embodiment, the frame 504 may provide for thermal diffusion or redistribution for heat produced by the battery cells 502.

One problem when the battery cells 402 are charged with high current is related to losses and temperature rise. There are two main contributors for the losses and temperature rise inside the battery pack 600, including:

(i) losses in PCBs 408 due to the resistance of some components, such as contacts, FETs, sensing resistance (e.g., resistor(s)), fuses, and copper trace; and (ii) losses in the battery cells 402, which are dominated by two factors: (a) Ohmic losses, which is a voltage drop due to the transfer of electrons in an electric circuit and movement of ions through an electrolyte and membrane (proportional to the internal cell resistance), with a quadratic dependence on current, and (b) other losses related to electrochemical reactions that occur during a charging process, with a linear dependence.

The strength of these factors depends on battery cell characteristics (e.g., electrolyte chemical composition, electrodes, technology, and so on). In conventional battery cells, an overtemperature curve of one battery cell for different charging current (with quadratic and linear contribution factors) tends to be parabolic of temperature versus charging current. The temperature contribution factors of the losses (Ohmic losses plus linear losses) are Joule-effect losses proportional to the square of the charging current.

Due to the presence of lithium and high flammability/reactivity thereof, maintaining the temperature of Li-Poly battery cells in a certain temperature range is to be fixed or established by cell manufacturer (even during charging process). In establishing the temperature range, a thermal-limited configuration of battery packs is to be in a manner that limits upper temperatures so as to avoid damage or catastrophic situation (e.g., fire) of the battery pack.

Figure 7:
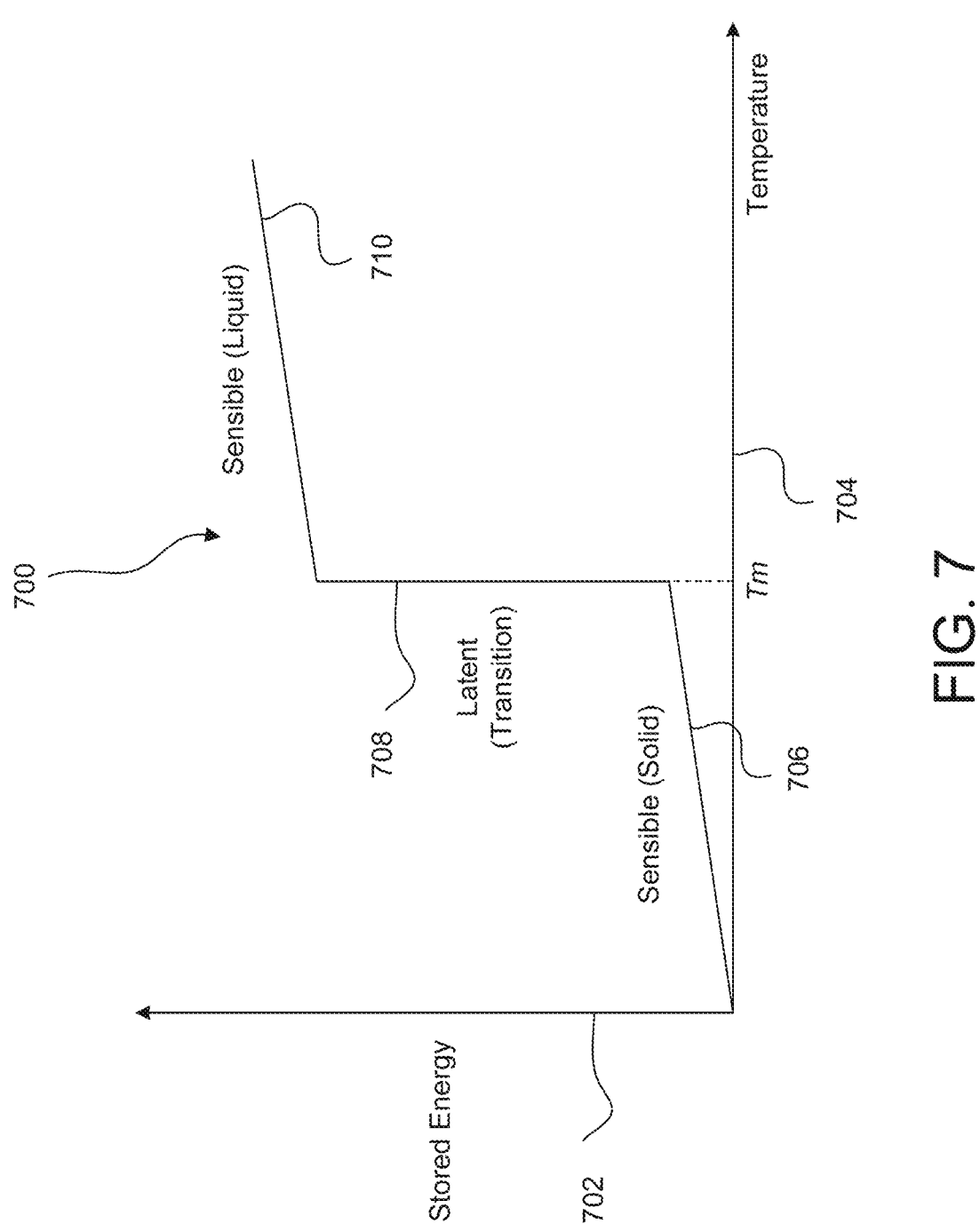
FIG. 7 is an illustration of an illustrative energy-temperature curve of phase change material (PCM)

With regard to FIG. 7, an illustration of an illustrative graph of an energy-temperature curve 700 that depicts functional thermodynamic operation of a battery pack, such as battery pack 600, inclusive of phase change material pouches, such as PCM pouches 404 (see, for example, FIG. 4A), is shown. The graph includes a store energy Y-axis 702 and a temperature X-axis 704, thereby providing for the energy-temperature curve 700 as stored energy over temperature of the PCM pouches 404 or, more systematically-speaking, the battery pack 600 as a whole by including the PCM pouches 404.

A first portion 706 of the energy-temperature curve 700 may have a linear, or substantially linear energy-temperature relationship below a transition or melting temperature (Tm). The first portion 706 below the melting temperature Tm is generally known as sensible heat when PCM is in a first state of matter (e.g., solid state). A second portion 708 of the energy-temperature curve 700 is shown to have a constant, or substantially constant temperature at the melting temperature Tm, over varying energy levels, which means that the PCM is able to maintain a substantially constant temperature despite absorbing or storing more and more thermal energy. At the melting temperature Tm, the PCM material is in a transition phase (e.g., transitioning from a solid state to a liquid state while melting). Such a temperature curve property is known as a latent or transition curve where stored energy is increased, but the temperature remains the same or substantially the same (e.g., within a couple of degrees or fraction of a degree). For example, the second portion 708 is at a constant temperature during a state transition of the PCM between the first state of matter (e.g., a solid) and a second state of matter (e.g., a liquid).

As an example, latent heat may provide large energy storage capacity within a very narrow temperature range. For example, 1 kg of ice at 0° C. requires 333 kJ of energy, as a latent heat, to produce 1 kg of water at 0° C. The same amount of energy as a sensible heat is enough to raise the temperature of water from 0° C. to 80° C. Simply speaking, with PCM material, the temperature of the battery pack may remain quite constant at a melting temperature Tm for a certain amount of the latent heat necessary to complete the phase transition from solid to liquid, for example. There are different types of PCM (organic, inorganic, eutectics) with different characteristics (e.g., melting temperature, specific heat capacity, or other characteristic). In an embodiment, an organic PCM that is non-toxic with a melting temperature in 35-39° C. range and latent heat equal to 210-230 J/g may be utilized for the PCM pouches 404. Alternative PCM material with a different melting temperature range may also be utilized.

As further shown in FIG. 6, the PCM may be disposed in one or more PCM pouches 404 and in contact with the battery cells 402, thereby enabling thermal energy produced by the battery cells 402 to be stored in the PCM pouches 404 so as to avoid overheating and causing damage to the battery pack 600, for example. Although the energy-temperature curve of FIG. 7 is shown to include a melting temperature Tm, it should be understood that the PCM pouches 404 may contain different phase change materials, thereby providing for different melting temperatures Tm. However, it should further be understood that different amounts of PCM in the PCM pouches 404, type of PCM material (e.g., specific heat capacity), and temperature change may enable different amounts of stored thermal energy to be retained in the PCM pouches 404, thereby supporting different rates of charging of the battery cells 402. In the case of the PCM pouches 404 providing for different transition temperatures, one or more PCM material types may be disposed in each of the same or respective PCM pouches 404 because each PCM material type may undergo a change of state at a defined transition temperature.

After the PCM pouches 404 reach a maximum stored energy at the melting temperature Tm, the phase of the PCM enters a sensible phase, in this case a liquid phase, at a third portion 710 of the energy-temperature curve 700. In this phase, slope of the curve begins to increase in both stored energy and temperature. As previously described, as the temperature increases, the risk of damage to the battery cells 402 and/or other components of the battery pack 600 increases. Hence, the PCM pouches 404 may be used to limit maximum temperature and define an amount of thermal energy that can be produced by the battery cells 402 over both time and temperature to avoid reaching a problematic situation for charging the battery cells 402. For example, based on the energy-temperature curve 700, the rate of charge of the battery cells 402 may be defined. Moreover, the defined rate of charge may be based on age of the battery pack 600 or based on a certain predicted state of the battery cells 402 in the future with the understanding that battery cells tend to heat more over time. The rate of charge may be based on an amount of current that is transferred from a power source to the battery cells 402 via the electrical contact 608 and rigid-flex PCB 406, where the higher the current, the faster the charge of the battery cells 402.

Figure 8:
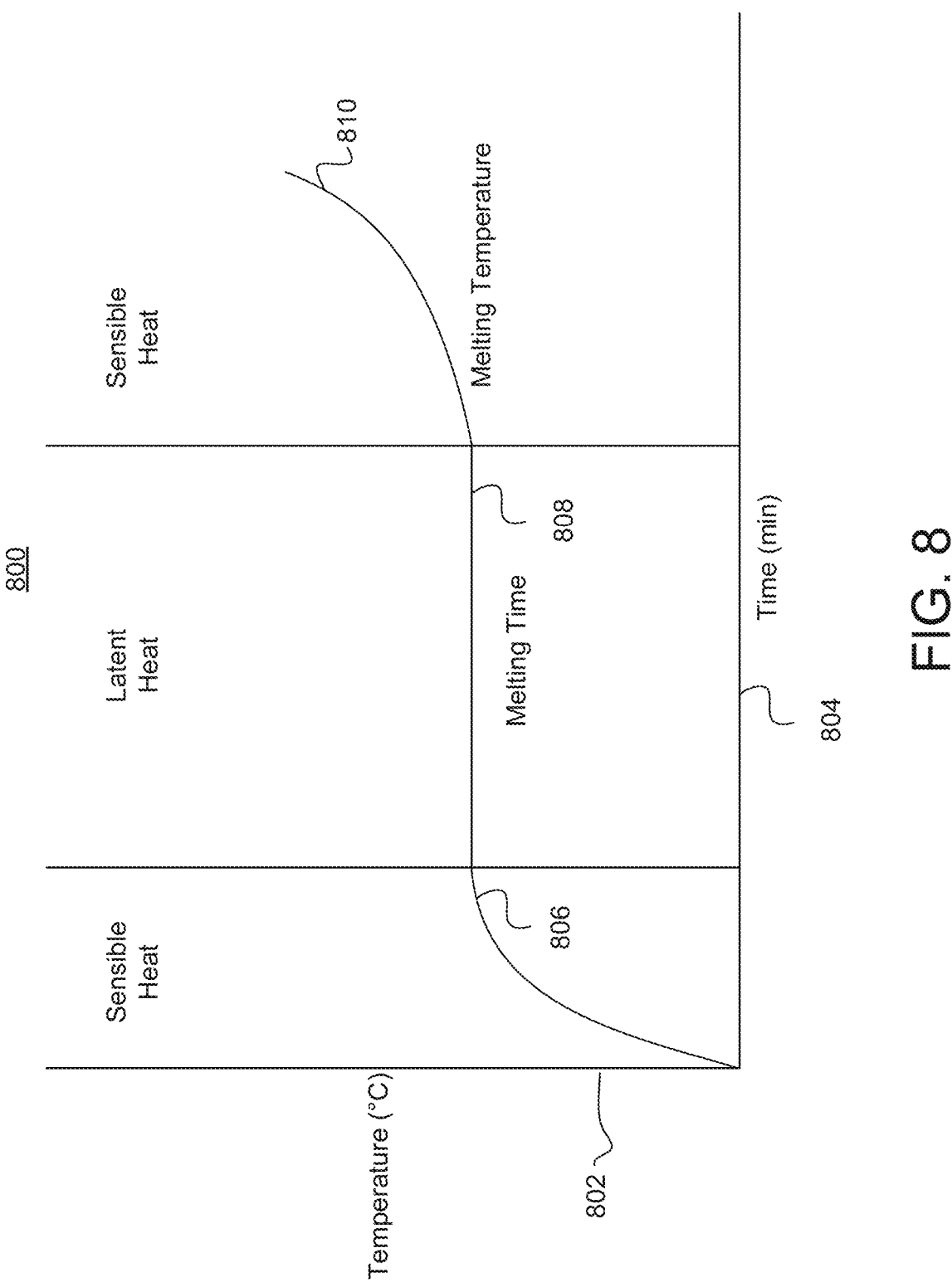
FIG. 8 is an illustration of an illustrative time-temperature curve for PCM.

With regard to FIG. 8, an illustration of an illustrative time-temperature curve 800 is shown. A temperature Y-axis 802 depicts a temperature of a PCM pouch, which may be a same temperature, or otherwise associated with a temperature of an adjacent portion of a battery pack 600, such as a battery cell, PCB, frame, or the like. A time axis 804 depicts a time of thermal sinking by the PCM material. As shown, the time-temperature curve 800 may be monotonic as the curve 800 only increases in temperature over time. In alternative embodiments, non-monotonic time-temperature curves 800 may be utilized or occur under certain conditions. For example, a rate of charging or discharging a battery cell may be reduced (e.g., halted) such that a dissipation of heat from the battery pack 600 may exceed a thermal contribution from the charging or discharging of the battery pack 600.

A first portion 806 of the time-temperature curve 800 has a steep increase in temperature while in the sensible heat phase as the PCM material of a PCM pouch 404 is in a first state (e.g., solid). A second portion 808 of the time-temperature curve 800 is shown with a constant temperature over a time period 804 while a phase change of the PCM is occurring. For example, the PCM may transition from a solid to liquid state in an endothermic reaction such that a temperature change of the PCM pouches 404 and/or the battery pack 600 may be limited or remain at a substantially constant temperature. A third portion 810 of the time-temperature curve 800 depicts a steep increase in temperature over time. The PCM may be in a different state (e.g., liquid) during the third portion 810 of the time-temperature curve 800 than during the first portion 806 of the time-temperature curve 800. The various states of the PCM material may have different specific heats associated therewith. For example, an increased temperature of a PCM material may be greater or lesser in a gaseous state, a liquid state, a solid state, and so on. Moreover, the dissipation of thermal energy from the battery pack 600 may increase coincident with an increased temperature within the battery pack 600 (e.g., linearly or non-linearly). For example, the battery pack 600 may dissipate energy at a greater rate at a temperature 20° C. above ambient than 10° C. above ambient. Thus, a transition temperature of the PCM material may be selected according to a temperature of an ambient environment, a maximum battery cell temperature, and/or a desired dissipation rate.

Figure 9:
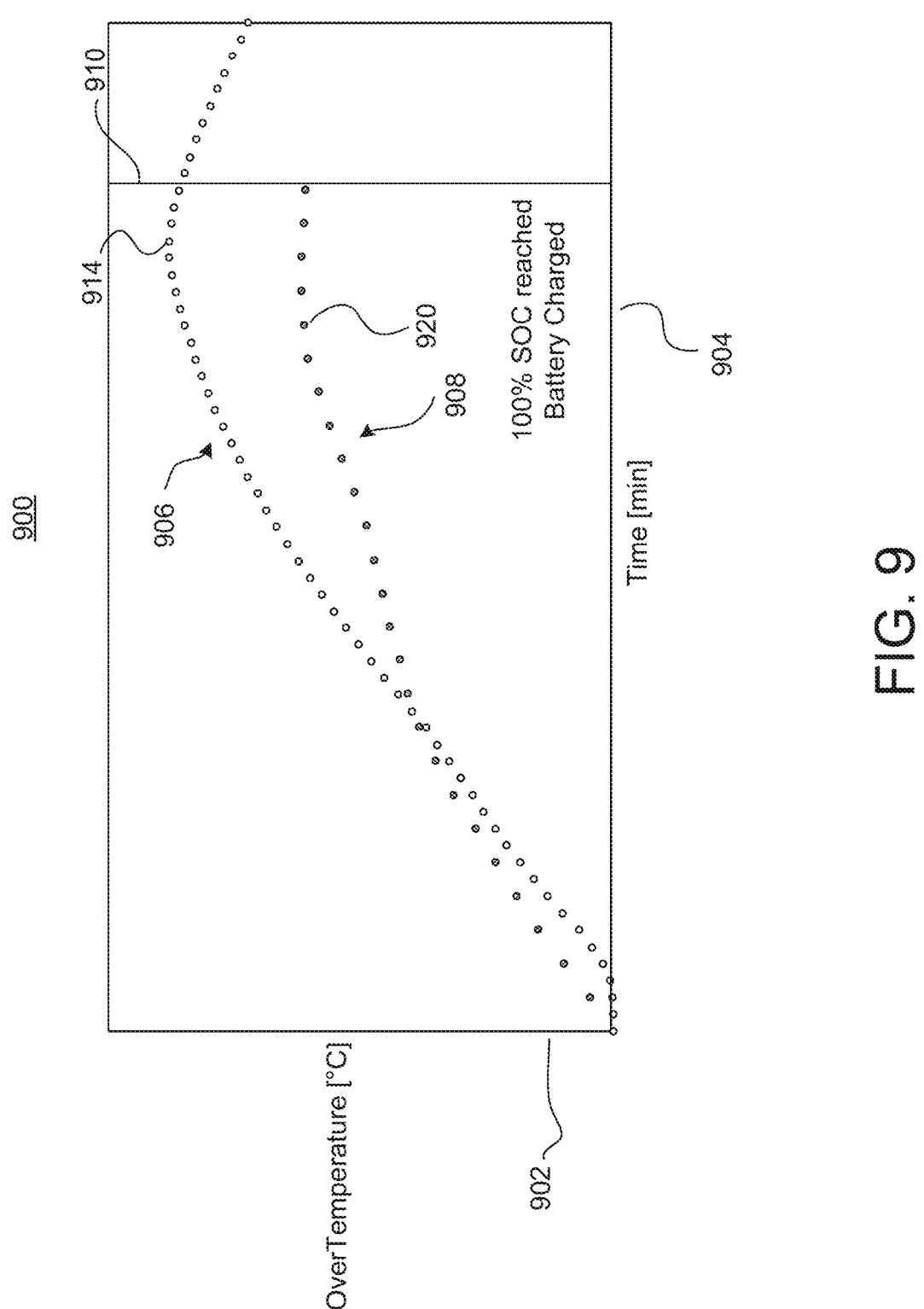
FIG. 9 is another illustration of an illustrative time-temperature curve for a battery pack during recharge that includes PCM pouch(es)

With regard to FIG. 9, a graph of an illustrative time-temperature curve 900 for a battery cell is shown. A temperature Y-axis 902 depicts overtemperature of the battery cell over time on the X-axis 904. The temperature may be measured by a temperature sensor (e.g., an NTC thermistor) mounted to a PCB (e.g., the second PCB 408*b*) electrically connected to one or more battery cells 402. A first time-temperature curve 906 corresponds to a battery pack or portion thereof (e.g., battery cell) lacking a PCM pouch. A second time-temperature curve 908 corresponds to a battery pack or portion thereof including or in contact with a PCM pouch, such as the battery pack 600 of FIG. 6.

The first time-temperature curve 906 shows an increase of overtemperature while charging the battery cell(s) of the battery pack 600 without any PCM pouches. For purposes of illustration, the charging may be performed by applying a constant amount of electrical power (e.g., 5 Amps) to the battery cells 402. A maximum temperature 914 is exhibited just prior to reaching 100% charge, where the maximum overtemperature is 22° C.

The second time-temperature curve 908 shows an increase of overtemperature while charging the battery cell(s) of the battery pack 600 with the PCM pouches 404. For purposes of illustration, the charging may be performed by applying the same constant amount of electrical power (i.e., 5 Amps) to the battery cells 402 with PCM pouches of 2.5 grams that are each engaged with the battery cells 402. A maximum temperature 920 is exhibited just prior to reaching 100% charge at timeline 910 at about 25 minutes, where the maximum overtemperature is 15° C. As further shown, the second time-temperature curve 908 exhibits a slightly higher rate of increase at the start (e.g., below 10 minutes), but then significantly lower rates of increase of overtemperature until finally reaching the maximum temperature 920, thereby causing for the battery pack 600 to be within a specified temperature range so as avoid damage or a catastrophic situation. As previously described, one or more PCM pouches 404 may be utilized, and each of the PCM pouches 404 may include the same amount or different amount of PCM material and have the same or different PCM material.

Because the temperature curve of the battery pack 600 with the PCM pouches 404 may be determined either theoretically or empirically, knowledge of the temperature-time curve may be utilized to control the temperature over time by controlling charging rates being applied to the battery pack 600. In an embodiment, a controller can receive temperature signals and measure duration, slope, or the like of the constant temperature region (and/or rates of temperature over other regions), and adjust an electrical power signal being used to charge the battery cells 402 in response thereto. Such adjustment of the electrical power signal may increase or decrease the duration or slope of the temperature-time curve, thereby altering temperature of the battery pack 600. And, because the PCM pouches 404 are utilized, charging speed may be increased without crossing a maximum temperature threshold. Monitoring the constant temperature region, including slope, duration, specific temperature, etc., may be one way to determine stability and functionality of the battery pack 600 over time, which may change due to repeated charge cycles, wear-and-tear of a handheld (or non-handheld) product in which the battery pack 600 is operating, temperature conditions in which the battery operated product is operating, and other factors that may cause mechanical, electrical, and/or chemical characterization of the battery cell 600 to change over time.

For example, a controller may cause the charge rate to decrease a rate of charge upon detecting a threshold temperature, or according to a predefined charge curve (e.g., a charge curve to decrease a rate of charge upon a reaching a predefined time, state of charge, or the like). As depicted, the temperature of the first time-temperature curve 906 may decrease upon reaching a desired state of charge 910. For example, the battery pack 104 may cease charging at the desired state of charge and may thereafter dissipate accumulated heat.

Figure 10:
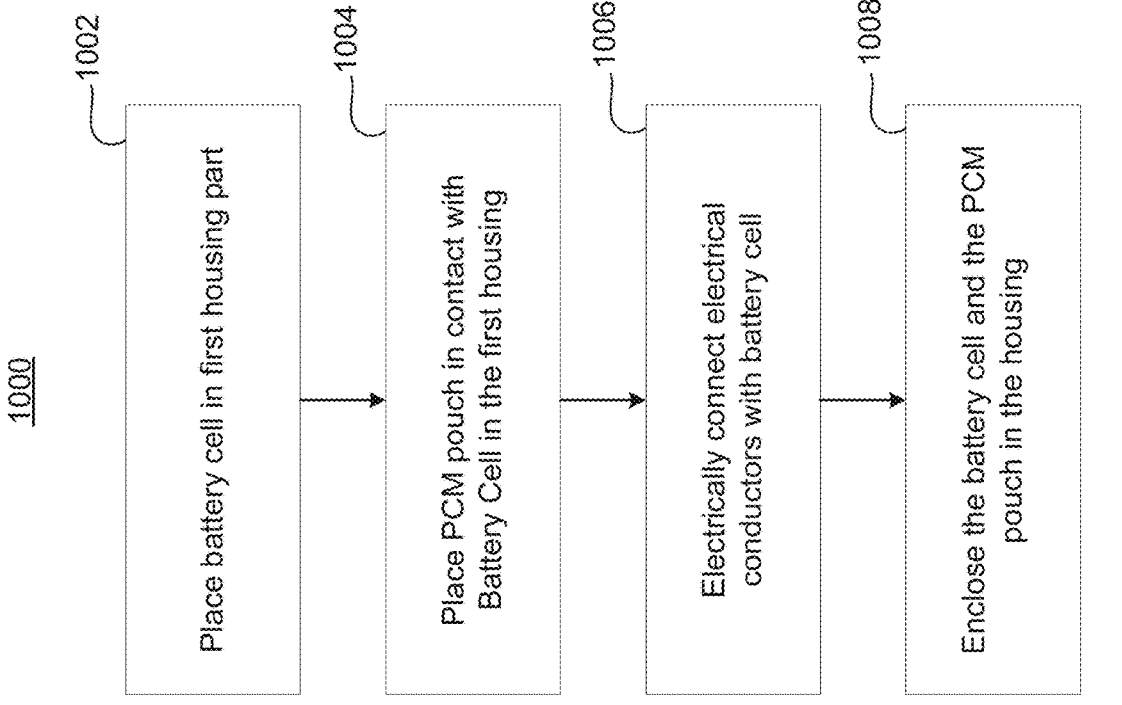
FIG. 10 is a flow diagram of an illustrative process for manufacturing a battery pack in accordance with the principles described herein.

With regard to FIG. 10, a flow diagram 1000 of an illustration process for manufacturing a battery pack, such as battery pack 104 is shown. In brief summary, at step 1002, a battery cell may be placed in a first housing part. At step 1004, a PCM pouch may be placed in contact with the battery cell in the first housing. At step 1006, the battery cell may be electrically connected. At step 1008, the battery cell and PCM pouch may be enclosed in a housing.

In further detail, at step 1002, a battery cell may be placed into a first housing part. The battery cell may be included in a stack (e.g., a stack including a PCM pouch) or placed within the housing individually. For example, the battery cell may be connected to one or more PCBs, or coupled with one or more frames or other mechanical support elements, thermal conductors, or the like. The battery cell may be a rechargeable cell, such as a lithium-ion battery cell, having an internal resistance that exceeds a heat dissipation of a battery pack at charging rate of 5 C, 10 C, or otherwise.

At step 1004, a PCM pouch is placed into contact with a battery cell. For example, the PCM pouch may be placed into contact with the battery cell placed into the first housing part of step 1002. The PCM pouch may be placed into contact with the rechargeable battery cell prior or subsequent to placing the rechargeable battery cell into the housing of the battery cell. The PCM pouch may include a PCM having a total thermal energy absorption (e.g., a sensible and latent energy) between a first and second temperature that maintains temperature of the battery pack to remain below a threshold temperature. The PCM pouch may be adhered to or otherwise joined to the battery cell.

At step 1006, electrical conductors are electrically connected with the battery cell. For example, the electrical connectors may enable power to be conducted to or from the battery cell. The electrical connectors may connect the battery cells to a PCB (e.g., a PCB which is placed into the battery housing). The PCB may connect to a further connector transiting a housing (e.g., the first housing part). For example, the further connector may connect to a battery charger, to receive energy therefrom, or a battery powered device, to deliver power to such a device (e.g., a barcode scanner).

At step 1008, the battery cell and the PCM pouch are enclosed in the housing. For example, a first housing part and a second housing part may enclose a stack comprising the PCM pouch and the battery cell. The stack may further include or interface with an elastic elements such as a foam insert which may maintain a dimension of the battery pack incident to swelling of the battery cell or the PCM pouch. According to some embodiments, the elastic element may adhere or interface to the housing (e.g., the first housing part). In some embodiments, one or more adhesives, mechanical connectors, gaskets, pins, screws, or the like may join the first housing part with at least on further housing part (e.g., a second housing part) such that the housing may encapsulate the stack comprising the battery cell and the PCM pouch so as to provide environmental protection for the stack.

One embodiment of a battery pack may include a housing, at least one rechargeable battery cell disposed within the housing, at least one phase change material (PCM) pouch in contact with the rechargeable battery cell(s) disposed within the housing, and electrical conductors electrically connected to the at least one rechargeable battery cell to enable electrical power to be conducted to and from the at least one rechargeable battery cell.

The rechargeable battery cell(s) may include two rechargeable battery cells, and the PCM pouch(s) may include (i) a first PCM pouch disposed between and in contact with the two rechargeable battery cells, one rechargeable battery cell on each side of the first PCM pouch, and a second PCM pouch disposed on an opposite side of the first PCM pouch and in contact with a first one of the rechargeable battery cells.

The battery pack may further include a first printed circuit board (PCB), and a second PCB in electrical communication with the first PCB via a flexible circuit board including electrical conductors disposed as trace lines, the first, second, and flexible circuit boards forming a rigid-flex printed circuit board. The first PCB may be positioned on an opposite side of a second of the rechargeable battery cells from the first PCM pouch, and a second PCB of the rigid-flex PCB may extend toward and centrally aligned between the rechargeable battery cells.

The battery pack may further include a foam element positioned on an opposite side of the first PCM pouch from the rechargeable battery cell with which the first PCM pouch is in contact.

The battery pack may further include a frame configured to support the first PCB. The rigid-flex PCB may include a flexible cable electrically connecting the first PCB with the second PCB. A flexible cable may electrically connect the first PCB with the second PCB. Second and third flexible cables connecting the second PCB with each of the rechargeable battery cells to supply the electrical power to and from the rechargeable battery cells. The housing may include a first housing part and a second housing part configured to connect with and secure to the first housing part. The housing may be formed by the first and second housing parts being connected with one another, and configured to enclose: (i) the frame, (ii) first PCB, (iii) one rechargeable battery cell, (iv) first PCM pouch, (v) another battery cell, (vi) second PCB pouch, and (vii) foam element.

The battery pack may further include end-foam pieces configured to be positioned at each end of the at least one rechargeable battery cell within the housing. The housing may be configured to be enclosed within a housing of a barcode scanner.

One embodiment of a method of manufacturing battery pack may include placing at least one rechargeable battery cell in a first housing part of a housing. At least one phase change material (PCM) pouch may be placed in contact with the at least one rechargeable battery cell within the first housing part. Electrical conductors may be electrically connected with the at least one rechargeable battery cell to enable electrical power to be conducted to and from the at least one rechargeable battery cell. A second housing part of the housing may be connected to the first housing part, thereby enclosing the at least one rechargeable battery cell and the at least one PCM pouch in the housing formed by the first and second housing parts.

Placing the at least one rechargeable battery cell in the first housing part may include placing two rechargeable battery cells in the first housing part. Placing the at least one PCM pouch may include (i) placing a first PCM pouch between and in contact with the two rechargeable battery cells, one on each side of the first PCM pouch, and (ii) placing a second PCM pouch in contact with one of the rechargeable battery cells and on an opposite side of the first PCM pouch.

The process may further include positioning a first printed circuit board (PCB) and a rigid-flex PCB in electrical communication therewith in the first housing part, where the PCB and rigid-flex PCB including the electrical conductors disposed as trace lines. The first PCB may be positioned on an opposite side of a second of the rechargeable battery cells from the first PCM pouch, and a second PCB of the rigid-flex PCB may be positioned extending toward and centrally aligned between the rechargeable battery cells.

The process may further include placing foam on an opposite side of the first PCM pouch from the rechargeable battery cell with which the first PCM pouch is in contact. End-foam pieces may be positioned at each end of the at least one rechargeable battery cell within the housing. The first and second housing parts may be formed to be installed within a housing of a barcode scanner.

One embodiment of a mobile device may include electronics including a processor configured to control the mobile device, and electrical power electronics configured to output electrical power. The mobile device may further include a battery pack electronically coupled to the electronics to supply electrical power thereto, the battery pack configured with a housing, at least one rechargeable battery cell, at least one phase change material (PCM) pouch in contact with the at least one rechargeable battery cell to absorb heat produced thereby. The rechargeable battery cell(s) and PCM pouch(s) being enclosed within the housing. Electrical conductors may be in electrical communication with the power electronics and the rechargeable battery cell(s), and configured to conduct electrical power to and from the rechargeable battery cell(s).

The battery pack may include two rechargeable battery cells, a first PCM pouch disposed between and in contact with the two rechargeable battery cells, one on each side of the first PCM pouch, and a second PCM pouch disposed in contact with one of the rechargeable battery cells and on an opposite side of the first PCM pouch.

The mobile device may further include a first printed circuit board (PCB) and a rigid-flex PCB in electrical communication therewith. The PCB and rigid-flex PCB may include the electrical conductors disposed as trace lines. The first PCB may be positioned on an opposite side of a second of the rechargeable battery cells from the first PCM pouch. A second PCB of the rigid-flex PCB may extend toward and centrally aligned between opposing walls of the rechargeable battery cells.

The battery pack may further include a foam element positioned on an opposite side of the first PCM pouch from the rechargeable battery cell with which the first PCM pouch is in contact. A frame may be configured to secure the first PCB, and wherein the rigid-flex PCB includes a flexible cable electrically connecting the first PCB with the second PCB. Second and third flexible cables connecting the second PCB with each of the rechargeable battery cells to supply the electrical power to and from the rechargeable battery cells. The housing may include a first housing part and a second housing part configured to connect with and secure to the first housing part, the housing formed by the first and second housing parts being connected with one another, and configured to enclose: (i) the frame, (ii) first PCB, (iii) one rechargeable battery cell, (iv) first PCM pouch, (v) another battery cell, (vi) second PCB pouch, and (vii) foam.

The mobile device may further include a temperature sensor configured to sense temperature of at least one of the rechargeable battery cells, and wherein the processor is configured to (i) measure the sensed temperature of the at least one rechargeable battery cell, (ii) determine an amount of time that the at least one rechargeable battery cell is at a melting temperature of the at least one PCM pouch, and (iii) in response to determining that the amount of time is below a time for PCM in the PCM pouch changes from a solid to a liquid, apply a first electrical power control signal to the electrical power electronics to cause the electrical power electronics to output a first electrical power level, otherwise, in response to determining that the amount of time crosses a threshold time for the PCM in the PCM pouch to change from a solid to a liquid, apply a second electrical power control signal to the electrical power electronics to cause the electrical power electronics to output a second electrical power level, thereby charging the at least one rechargeable battery cell. The PCM pouch(es) may include multiple PCM pouches including the same PCM material.

The foregoing method descriptions and the process flow diagrams are provided merely as illustrative examples and are not intended to require or imply that the steps of the various embodiments must be performed in the order presented. As will be appreciated by one of skill in the art, the steps in the foregoing embodiments may be performed in any order. Words such as "then," "next," etc. are not intended to limit the order of the steps; these words are simply used to guide the reader through the description of the methods. Although process flow diagrams may describe the operations as a sequential process, many of the operations may be performed in parallel or concurrently. In addition, the order of the operations may be re-arranged. A process may correspond to a method, a function, a procedure, a subroutine, a subprogram, etc. When a process corresponds to a function, its termination may correspond to a return of the function to the calling function or the main function.

The various illustrative logical blocks, modules, circuits, and algorithm steps described in connection with the embodiments disclosed here may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to and/or in communication with another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the invention. Thus, the operation and behavior of the systems and methods were described without reference to the specific software code being understood that software and control hardware can be designed to implement the systems and methods based on the description here.

When implemented in software, the functions may be stored as one or more instructions or code on a non-transitory computer-readable or processor-readable storage medium. The steps of a method or algorithm disclosed here may be embodied in a processor-executable software module which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used here, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The previous description is of a preferred embodiment for implementing the invention, and the scope of the invention should not necessarily be limited by this description. The scope of the present invention is instead defined by the following claims.

What is claimed is:

1. A battery pack, comprising:

a housing;

at least two rechargeable battery cells disposed within the housing;

at least one phase change material (PCM) pouch including:

a first PCM pouch disposed between and in contact with the at least two rechargeable battery cells, one rechargeable battery cell on each side of the first PCM pouch; and a second PCM pouch disposed on an opposite side of the first PCM pouch and in contact with a first one of the rechargeable battery cells;

electrical conductors electrically connected to the at least two rechargeable battery cells to enable electrical power to be conducted to and from the at least two rechargeable battery cells;

a first printed circuit board (PCB); and a second PCB in electrical communication with the first PCB via a flexible circuit board including electrical conductors disposed as trace lines, the first, second, and flexible circuit boards forming a rigid-flex printed circuit board, and wherein:

the first PCB is positioned on an opposite side of a second of the rechargeable battery cells from the first PCM pouch; and the second PCB of the rigid-flex PCB extending toward and centrally aligned between the rechargeable battery cells.

2. The battery pack according to claim 1, wherein the battery pack further includes a foam element positioned on an opposite side of the first PCM pouch from the rechargeable battery cell with which the first PCM pouch is in contact.

3. The battery pack according to claim 2, further comprising:

a frame configured to support the first PCB, and wherein the rigid-flex PCB includes a flexible cable electrically connecting the first PCB with the second PCB;

a flexible cable electrically connecting the first PCB with the second PCB;

second and third flexible cables connecting the second PCB with each of the rechargeable battery cells to supply the electrical power to and from the rechargeable battery cells; and wherein the housing includes a first housing part and a second housing part configured to connect with and secure to the first housing part, the housing formed by the first and second housing parts being connected with one another, and configured to enclose: (i) the frame, (ii) first PCB, (iii) one rechargeable battery cell, (iv) first PCM pouch, (v) another battery cell, (vi) second PCB pouch, and (vii) foam element.

4. The battery pack according to claim 1, further comprising end-foam pieces configured to be positioned at each end of the at least two rechargeable battery cells within the housing.

5. The battery pack according to claim 1, wherein the housing is configured to be enclosed within a housing of a barcode scanner.

6. The battery pack according to claim 1, wherein a volume of PCM material of the at least one PCM pouch is configured to maintain a battery cell temperature below a temperature threshold during a charging thereof.

7. The battery pack according to claim 1, wherein the at least two rechargeable battery cells are electrically connected in a parallel configuration.

8. A method of manufacturing battery pack, said method comprising:

placing at least two rechargeable battery cell in a first housing part of a housing;

placing at least one phase change material (PCM) pouch in contact with the at least two rechargeable battery cells within the first housing part, including:

placing a first PCM pouch between and in contact with the two rechargeable battery cells, one on each side of the first PCM pouch; and placing a second PCM pouch in contact with one of the rechargeable battery cells and on an opposite side of the first PCM pouch;

electrically connecting electrical conductors with the at least two rechargeable battery cells to enable electrical power to be conducted to and from the at least two rechargeable battery cells;

positioning a rigid-flex printed circuit board (PCB) including a first PCB and a second PCB connected via a flexible electrical connector;

positioning the first PCB on an opposite side of a second of the rechargeable battery cells from the first PCM pouch;

positioning the second PCB of the rigid-flex PCB extending toward and centrally aligned between the rechargeable battery cells; and connecting a second housing part of the housing to the first housing part, thereby enclosing the at least two rechargeable battery cells and the at least one PCM pouch in the housing formed by the first and second housing parts.

9. The method according to claim 8, further comprising placing foam on an opposite side of the first PCM pouch from the rechargeable battery cell with which the first PCM pouch is in contact.

10. The method according to claim 8, further comprising placing end-foam pieces at each end of the at least two rechargeable battery cells within the housing.

11. The method according to claim 8, further comprising forming the first and second housing parts to be installed within a housing of a barcode scanner.

12. A mobile device, comprising:

electronics including:

a processor configured to control the mobile device; and electrical power electronics configured to output electrical power; and a battery pack electronically coupled to the electronics to supply electrical power thereto, and configured with:

a housing;

at least two rechargeable battery cells;

at least one phase change material (PCM) pouch in contact with the at least two rechargeable battery cells to absorb heat produced thereby, the at least one PCM pouch including:

a first PCM pouch disposed between the at least two rechargeable battery cells, one on each side of the first PCM pouch; and a second PCM pouch disposed on an opposite side of the first PCM pouch;

a rigid-flex printed circuit board (PCB) including a first PCB in electrical communication with a second PCB via flexible electrical connector, wherein:

the first PCB is positioned on an opposite side of a second of the rechargeable battery cells from the first PCM pouch; and the second PCB is extended toward and centrally aligned between opposing walls of the at least two rechargeable battery cells; and electrical conductors in electrical communication with the power electronics and the at least two rechargeable battery cells, and configured to conduct electrical power to and from the at least two rechargeable battery cells, wherein the at least two rechargeable battery cells, the at least one PCM pouch, and the rigid-flex PCB are enclosed within the housing.

13. The mobile device according to claim 12, wherein the battery pack further includes a foam element positioned on an opposite side of the first PCM pouch from the rechargeable battery cell with which the first PCM pouch is in contact.

14. The mobile device according to claim 13, further comprising:

a frame configured to secure the first PCB, and wherein the rigid-flex PCB includes a flexible cable electrically connecting the first PCB with the second PCB;

second and third flexible cables connecting the second PCB with each of the rechargeable battery cells to supply the electrical power to and from the rechargeable battery cells, and wherein the housing includes a first housing part and a second housing part configured to connect with and secure to the first housing part, the housing formed by the first and second housing parts being connected with one another, and configured to enclose: (i) the frame, (ii) first PCB, (iii) one rechargeable battery cell, (iv)

first PCM pouch, (v) another battery cell, (vi) second PCB pouch, and (vii) foam.

15. The mobile device according to claim 12, further comprising a temperature sensor configured to sense temperature of at least one of the rechargeable battery cells, and wherein the processor is configured to:

measure the sensed temperature of the at least two rechargeable battery cells;

determine an amount of time that the at least two rechargeable battery cells is at a melting temperature of the at least one PCM pouch; and in response to determining that the amount of time is below a time for PCM in the PCM pouch changes from a solid to a liquid, apply a first electrical power control signal to the electrical power electronics to cause the electrical power electronics to output a first electrical power level, otherwise, in response to determining that the amount of time crosses a threshold time for the PCM in the PCM pouch to change from a solid to a liquid, apply a second electrical power control signal to the electrical power electronics to cause the electrical power electronics to output a second electrical power level, thereby charging the at least two rechargeable battery cells.

16. The mobile device according to claim 12, wherein the at least one PCM pouches includes multiple PCM pouches including the same PCM material.

17. The mobile device according to claim 12, wherein the first PCB includes a controller configured to monitor, control, and/or interrupt operation of the battery pack.

18. The mobile device according to claim 17, wherein the controller is configured to receive a temperature signal from one or more temperature sensors disposed on the first PCB, a second PCB, or on a wall of one of the at least two rechargeable battery cells.

19. The mobile device according to claim 12, wherein the rigid-flex PCB includes the electrical conductors disposed as trace lines.

20. The mobile device according to claim 12, wherein the first PCM pouch contacts both of the at least two rechargeable battery cells.

* * * * *